United States Patent [19]
Smolinsky et al.

[11] 3,864,019
[45] Feb. 4, 1975

[54] OPTICAL FILM-FIBER COUPLER

[75] Inventors: Gerald Smolinsky, New Vernon; Ping King Tien, Chatham, both of N.J.

[73] Assignee: Bell Telephone Laboratories, Incorporated, Murray Hill, N.J.

[22] Filed: Nov. 15, 1973

[21] Appl. No.: 415,936

[52] U.S. Cl. ......... 350/96 WG, 350/96 C, 350/96 B, 350/160
[51] Int. Cl. ............................................. G02b 5/14
[58] Field of Search .......... 350/96 WG, 96 C, 96 R, 350/151, 160

[56] References Cited
UNITED STATES PATENTS

| | | | |
|---|---|---|---|
| 3,584,230 | 6/1971 | Tien | 333/95 |
| 3,674,337 | 7/1972 | Marcatili | 350/96 WG |
| 3,791,715 | 2/1974 | Lean et al. | 350/96 WG |

OTHER PUBLICATIONS

"Experiments On Light Waves In A Thin Tapered Film And A New Light-Wave Coupler" by Tien, et al., Vol. 18, No. 9 of Applied Physics Letters, Pps. 398–401, May 1971.

*Primary Examiner*—Alfred E. Smith
*Assistant Examiner*—Saxfield Chatmon, Jr.
*Attorney, Agent, or Firm*—Wilford L. Wisner; E. W. Adams, Jr.

[57] ABSTRACT

There is disclosed an arrangement for coupling guided optical waves from thin-film waveguides to fiber waveguides, and vice versa. The thin film in the former type of guide is provided with an end region which is gradually tapered in thickness along the path of the wave to be guided therein to a cut-off value for the wave. This tapered region of the film causes the wave to propagate out of the film into the lower refractive index substrate of the guide along a small angle with respect to the film-substrate interface. Situated in the substrate slightly below the film-substrate interface is a cavity having a cross-sectional shape and cross-sectional dimensions adapted for receiving an end of the fiber waveguide. By properly selecting the orientation and position of the cavity in the substrate, and of the fiber in the cavity, the fiber can be made to intercept the wave coupled out of the film. To insure efficient coupling of the wave into the fiber, the cavity is provided with a hemispherical end shape and is filled with a transparent material having a refractive index exceeding that of the substrate. A hemispherical lens is thereby formed which focuses and directs the wave into the fiber. Efficient coupling of the guided wave from the thin film to the fiber, or from the fiber to the thin film, is thus possible.

8 Claims, 5 Drawing Figures

DISTANCE FROM $X_c$ IN MILLIMETERS

3,864,019

OPTICAL FILM-FIBER COUPLER

BACKGROUND OF THE INVENTION

This invention relates to a coupling arrangement for different types of optical waveguides and, more particularly, to an arrangement for coupling thin-film optical waveguides to fiber optical waveguides, and vice versa.

Ever since the first laser was successfully operated more than a decade ago, suggestions have been made for the use of laser beams as carrier waves in communication systems. The main attraction of an optical communication system is the large range of frequencies, and, consequently, large bandwidth, available for information transmission. Carrier waves in the optical region of the electromagnetic spectrum (which includes, collectively, the ultraviolet, visible and infrared regions thereof) will, at least theoretically, have several orders of magnitude higher information-carrying capacities than conventional lower frequency carriers (e.g., microwave carriers). Additionally, since the wavelength of the optical wave is typically of the order of one micrometer or less (which is about 10,000 times smaller than that of the microwave), miniature, naturally compact components and devices could be employed, making optical communication systems economically promising for both long and short distance transmission.

Like conventional lower frequency systems, optical communication systems will require means for carrying optical information signals along desired transmission lines and means for processing the signals at terminal points, and at repeater points intermediate thereto. Present indications are that miniature fiber waveguides will be used to carry the optical signals between repeater and terminal points, while miniature integrated optical circuits in the form of thin-film waveguides will be used at the repeater and terminal points to process the signals. There thus exists a need in the art for an arrangement for efficiently transferring, or coupling, the guided optical information signals from one type of waveguide to the other.

As will be recognized by those skilled in the art, a fiber optical waveguide is one which comprises an elongated fiber-like body of dielectric material, at least a portion of which has an index of refraction exceeding that of the medium immediately surrounding it, so that an optical wave propagating in the fiber is effectively confined thereby. The fiber may include an inner core of one dielectric material which is surrounded by an outer cladding of another dielectric material having an index of refraction that is less than that of the core. Alternatively, the fiber may be formed from a single dielectric material having a uniform refractive index exceeding that of its surroundings (e.g., air) or a refractive index which is a maximum along an inner axis and which progressively decreases away from the axis. An optical thin-film waveguide is one which comprises a film-like body of dielectric material which is disposed on a major surface of a dielectric substrate having an index of refraction that is less than that of the film. The film has a thickness which is generally of the order of the wavelength of the optical wave to be propagated therein, so that the wave is effectively confined within that dimension by the dielectric discontinuities provided by the major surfaces of the film.

While there are several known alternative arrangements for coupling optical waves into and out of thin-film waveguides (e.g., prism couplers, optical grating couplers) and into and out of fiber waveguides (e.g., microscopic lens couplers), there are few, if any, satisfactory arrangements for efficiently coupling thin-film waveguides to fiber waveguides, and vice versa. In addition to being efficient, a desirable optical film-fiber coupling arrangement would be one which features relative structural simplicity, ease of fabrication, ruggedness and reliability in use, and which is otherwise compatible with proposed integrated and fiber optics systems.

SUMMARY OF THE INVENTION

We have discovered an optical film-fiber coupling arrangement which possesses all of these features.

According to our invention, the thin dielectric film in a thin-film optical waveguide is provided with an end region which is gradually and smoothly tapered in thickness along the path of the guided wave therein to a cut-off value for the wave. This taper is essentially a smooth decrease of the relative propagation constant of the film to a point at which the film will no longer support as a guided mode the wave propagating therein, whereupon the wave emerges from the film and enters the substrate at a small angle with respect to the film-substrate interface. Complete coupling of the wave out of the film can be achieved in this manner. Situated in the substrate, slightly below the film-substrate interface, is a cavity having a cross-sectional shape and cross-sectional dimensions adapted for receiving an end of a fiber waveguide. By properly selecting the orientation and position of the cavity in the substrate, and of the fiber in the cavity, the fiber can be made to intercept the wave coupled out of the film. To insure efficient coupling of the wave into the fiber, the cavity is provided with a hemispherical end shape and is filled with a transparent cement or other material having a refractive index exceeding that of the substrate. A hemispherical lens is thereby formed in the structure which focuses and directs the wave into the fiber. Efficient coupling of the guided wave from the thin film to the fiber, or from the fiber to the thin film, is thus possible.

The principal advantages of the coupling arrangement of our invention result primarily from its overall structural simplicity. Unlike various prior art coupling arrangements, cumbersome prisms or lenses and precise optical gratings are not required. The desired taper in the thin film of our arrangement can be formed naturally with conventional film fabrication techniques. The desired cavity in the substrate can be provided by simple mechanical drilling. Once the optimum position of the fiber in the cavity is selected, the fiber can be cemented in place, thereby providing an integrated film-fiber structure which would be both rugged and stable in use. These and other features and advantages of the arrangement make it ideally suited for use in future optical communications systems and for other applications involving guided optical waves.

BRIEF DESCRIPTION OF THE DRAWING

The various features and advantages of the invention will be better understood from the following detailed description taken in conjunction with the accompanying drawing, in which.

DETAILED DESCRIPTION

Figure 1:
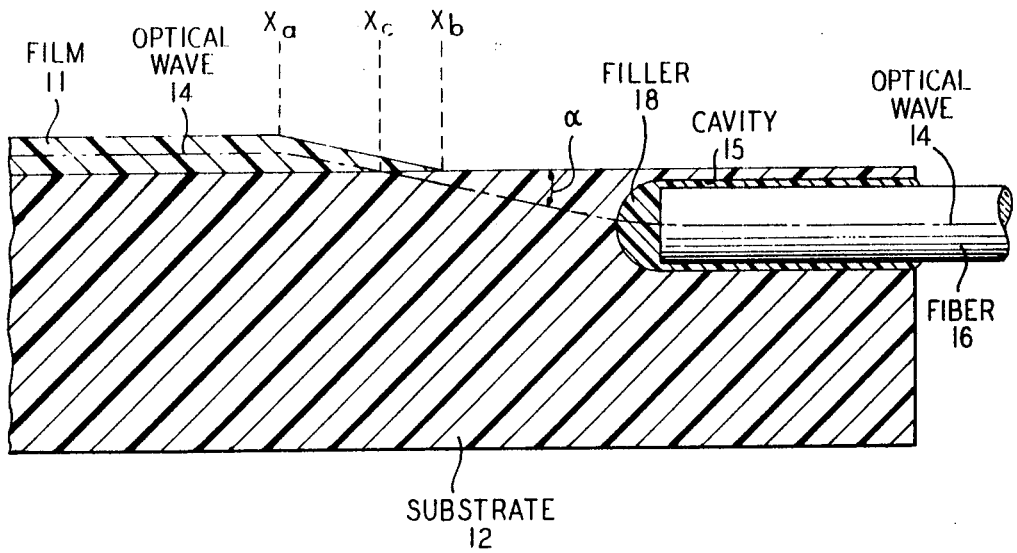
FIG. 1 is a pictorial illustration of a cross-sectional view of an illustrative embodiment of the invention fo coupling a guided optical wave from a thin-film waveguide to a fiber waveguide.

In the illustrative embodiment of FIG. 1, it is desired to couple optical wave 14, shown simply as the center line of the propagation of the wave, from dielectric thin film 11 to fiber 16. Specifically, on the left side of the structure of FIG. 1, there is shown an optical thin-film waveguide comprising transparent dielectric thin film 11, which is formed on transparent substrate 12 having an index of refraction which is less than that of film 11. Film 11 has an essentially uniform thickness of the order of the free space or vacuum wavelength of guided optical wave 14 along most of its length with the exception of an end region between points $X_a$ and $X_b$, as shown in the figure. Starting at point $X_a$, the thickness of film 11 is gradually and smoothly tapered until it is zero at point $X_b$. The taper in film 11 is illustratively linear between points $X_a$ and $X_b$ and extends over a distance of the film substantially greater than the value of the free space wavelength of optical wave 14 (i.e., greater than about 10 times the wavelength). This taper is essentially a smooth decrease of the relative propagation constant of film 11 to a point, designated $X_c$ in the figure, at which the film will no longer support optical wave 14 as a guided mode, whereupon the wave emerges from the film and enters substrate 12 at an angle $\alpha$ with respect to the film-substrate interface. Substrate 12 is provided with an elongated cavity 15 having a cross-sectional shape and cross-sectional dimensions adapted for receiving an end of optical fiber waveguide 16. Fiber waveguide 16 is illustratively an unclad, cylindrically-shaped fiber; and cavity 15 illustratively has a cylindrical shape with an inner diameter slightly greater than the outer diameter of the fiber, so that an end of the fiber can be inserted in the cavity. It is preferred that the cavity diameter exceed the outer diameter of the fiber only by an amount necessary to insure easy insertion of the fiber in the cavity. The desired coupling is achieved as optical wave 14 in substrate 12 is intercepted by fiber 16 positioned in cavity 15. To insure efficient coupling of wave 14 into fiber 16, cavity 15 is illustratively provided with a hemispherical end shape and is filled with a transparent filler material 18 having an index of refraction which exceeds that of substrate 12. A hemispherical lens is thereby formed at the end of fiber 16 which focuses and directs optical wave 14 into the fiber.

Further illustrative details that may be associated with the embodiment of FIG. 1 are given below. It will be noted from this description that the various elements of FIG. 1 are not necessarily drawn to scale or to relative dimension.

Optical wave 14 is illustratively a 0.6328 A wavelength beam (1 A = $10^{-8}$ centimeters) supplied by a conventional helium-neon laser source (not shown), and coupled into thin film 11 by any of the conventional coupling techniques (e.g., a prism-film coupler). The material of film 11 is a glow discharge polymer formed from vinyltrimethylsilane and that of substrate 12 is poly(methyl methacrylate), which materials have indices of refraction of about 1.53 and 1.49, respectively, at the 0.6328 A wavelength. The initial thickness of film 11 is about 4,000 A and it supports only one TE waveguide mode of optical wave 14. The slope of the taper in film 11 between points $X_a$ and $X_b$ is illustratively about 0.01 (i.e., the distance between $X_a$ and $X_b$ is about 10 optical wavelengths). Fiber waveguide 16 is an unclad, cylindrically shaped glass fiber having a diameter of about 0.5 millimeters and a uniform index of refraction equal to about 1.52, or about 2 per cent higher than that of substrate 12. Cavity 15 has an inner diameter of about 0.62 millimeters. It is illustratively situated about 0.2 millimeters below the upper major surface of substrate 12 and has an overall length of about 2 millimeters. The end of fiber 16 is illustratively spaced about 2 millimeters from cut-off point $X_c$. Cavity 15 is filled with a transparent filler material 18, such as monomeric cyclohexyl methacrylate, which, when polymerized by photopolymerization, has an index of refraction about 1 per cent higher than that of substrate 12. Photopolymerization of the cyclohexyl methacrylate filler in cavity 15 provides a firm attachment of fiber 16 to substrate 12.

Preliminary experiments on the embodiment of FIG. 1 with the above-specified materials and parameters have produced coupling efficiencies from film 11 to fiber 16 in excess of 60 per cent. Substantial improvements in coupling efficiencies are anticipated with further experimental refinements of the arrangement.

It will be recognized by those skilled in the art that the tapered end region of film 11 can be produced naturally during deposition of the film material on substrate 12. For example, when polymeric compounds such as the vinyltrimethylsilane polymer are used as the film material, the film can be fabricated by the RF discharge plasma polymerization process described in detail in Volume 119 of the *Journal of the Electrochemical Society*, page 451 (1972) and Volume 11 of *Applied Optics*, page 637 (1972). The tapered edge of the film is formed naturally along a region of discontinuity in the height of the substrate surface provided by placing a mechanical mask of a selected thickness (e.g., a simple rectangular metal plate) at the appropriate position on the substrate (e.g., with its edge along $X_b$ into the plane of the figure) during deposition of the film material. The length of the taper so produced is roughly linear and extends over a distance roughly proportional to the thickness of the mask, up to a few millimeters. A relatively long taper in the film can be provided using a mask, the bottom surface of which is undercut to produce a cantilever edge. A standard razor blade is useful as a mask for this purpose. Tapers extending over distances of about 5 millimeters can be produced in this manner. When other suitable film materials, such as various semiconductors or various optical glasses, are employed, conventional vacuum evaporation or reactive sputtering processes can be used to form the films. In each of these processes, the tapered edge of the film can be produced by depositing the film material through a mechanical mask in the manner described above.

The desired cavity in substrate 12 can be provided by simple mechanical drilling. Standard drill bits of sizes corresponding to the desired inner diameter of the cavity are generally available. Essentially hemispherical end shapes in the cavities are provided naturally upon drilling with conventional bits.

The effect of the tapered film on the optical wave propagating therein can be generally explained using ray optics. An optical wave, such as wave 14 shown in FIG. 1, may be considered as a plane wave which bounces back and forth as it is internally reflected at the upper and lower surfaces of film 11, thereby forming a zigzag path as it propagates in the film. As the wave enters the tapered region, the angle it makes with the normal to the lower surface of the film becomes continuously smaller until it is smaller than the critical angle of internal reflection at the film-substrate interface. At this point, the cut-off point $X_c$, the wave is no longer reflected back into the film but enters the substrate as a reflected wave.

To determine the profile of the wave in the substrate requires the use of wave theory. As indicated previously, the taper in the film constitutes a smooth and continuous decrease of the relative propagation constant of the film. The effect of this decrease in relative propagation constant can be analyzed by dividing the tapered region of the film into a large number of small steps and by carrying out a series of numerical wave calculations successively at each of the steps until the cut-off point $X_c$ in the taper is reached. These calculations shows that at a distance of several optical wavelengths in front of $X_c$ in the taper, there commences a gradual conversion of the optical wave guided in film 11 into substrate modes until, at $X_c$, the wave energy is completely eliminated from the film and reappears in substrate 12 as a radiation field. By a mathematical method known as the method of stationary phase (J. Mathews and R. L. Walker, "Mathematical Methods of Physics," W. A. Benjamin, 1965, pages 85–86), the far-field pattern of the radiation emerging from film 11 can be calculated. It can be shown that the optical wave in the substrate is sharply directed at a small angle with respect to the film-substrate interface, provided the taper in film 11 is gradual and nearly linear. The wave emerging from the film is thus relatively highly collimated, which is desirable for interception in the substrate by optical fiber 16.

Figure 2:
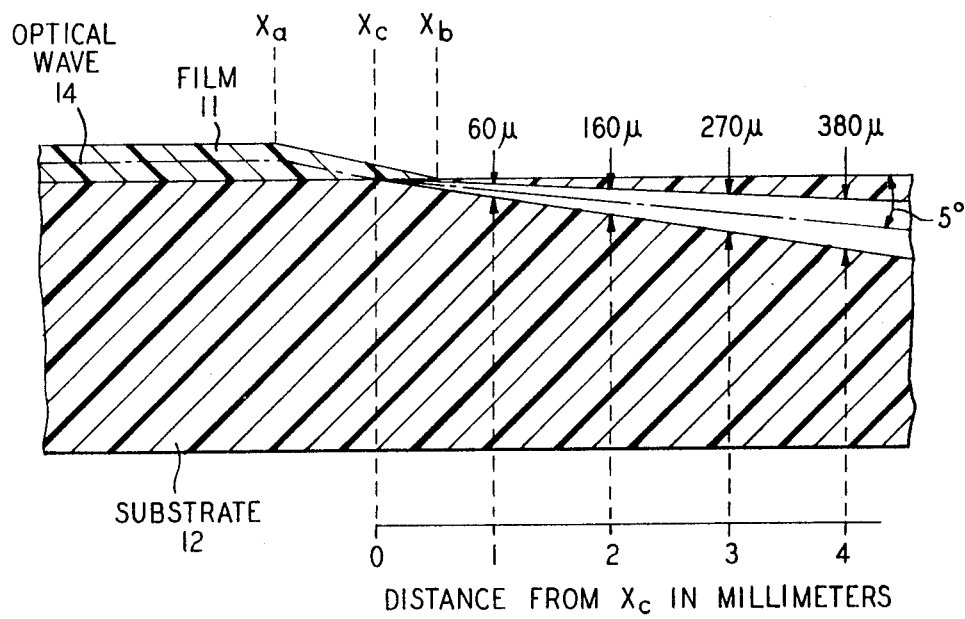
FIG. 2 is a pictorial illustration of a cross-sectional view of a tapered thin-film structure useful in explaining the operation of the invention.
Figure 3A:
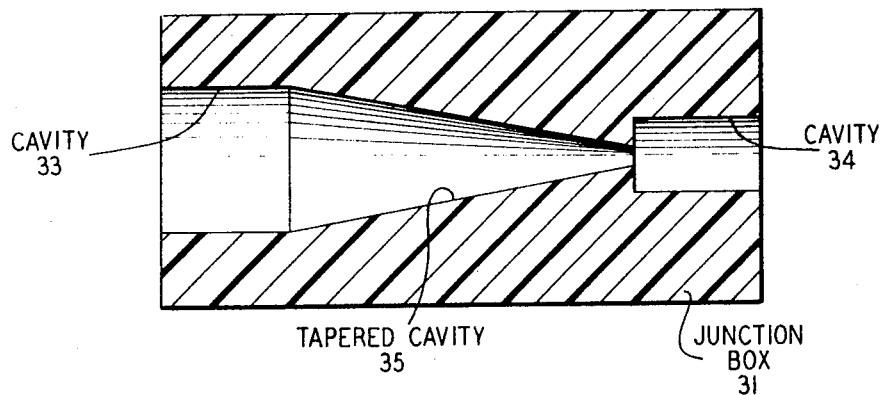
FIGS. 3A and 3B are cross-sectional views of a junction box useful in combination with the invention for optically connecting large diameter fibers to small diameter fibers.

FIG. 2 of the drawing illustrates the shape of the calculated beam profile in the substrate for a tapered film and substrate arrangement of the type illustratively described hereinabove in connection with FIG. 1. It is noted that the center of the beam profile in substrate 12 forms an angle of about 5° with respect to the film-substrate interface. No significant change is obtained in the beam profile by changing the slope of the taper in film 11 from 0.01 to 0.001. At a distance of 1 millimeter from the cut-off point $X_c$, the beam in substrate 12 has a diameter of about 60 micrometers, while at a distance of 4 millimeters from $X_c$ the beam diameter has increased to about 380 micrometers. To intercept all of the radiation emerging from film 11, and thus to insure an efficient coupling of the wave into the fiber, the fiber diameter should exceed the diameter of the wave at the point of interception in the substrate. With relatively large diameter fibers, that is, fibers having outer diameters of the order of 100 free space wavelengths or more, this requires simply that the cavity be positioned in the substrate and the fiber be positioned in the cavity so that the end of the fiber is sufficiently close to the cut-off point $X_c$ in the film. With smaller diameter fibers, and with cladded fibers having relatively small diameter inner cores, such a positioning of the cavity and the fiber may be difficult because of the small angle the wave in the substrate makes with the film-substrate interface. For this reason, structures such as those described hereinbelow in connection with FIGS. 3A, 3B and 4 may be useful.

As noted previously, a gradual, substantially linear taper in film 11 is effective in providing a relatively highly collimated wave in substrate 12, which facilitates efficient coupling of the wave into fiber 16. Tapers extending over distances greater than about 10 times the free space wavelength of optical wave 14, and preferably greater than 100 times the wavelength, are sufficiently gradual for purposes of the invention. A gradual taper in film 11 is also effective in preventing reflection of the guided wave and in minimizing losses due to scattering and absorption at or near the cut-off point in the film. For a detailed analysis of the use of the thickness-tapered end region for coupling light out of a thin-film waveguide, reference is made to the article by P. K. Tien and R. J. Martin in Volume 18 of *Applied Physics Letters*, page 398 (1971) and to U.S. Pat. No. 3,617,109 issued to P. K. Tien on NOv. 2, 1971.

Figure 3B:
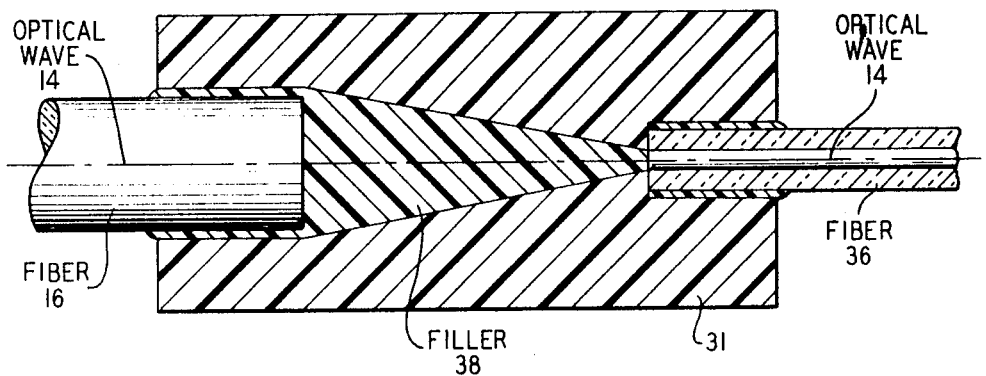

One technique for facilitating coupling of a guided optical wave to relatively small diameter fibers, or to cladded fibers having relatively small diameter inner cores, is to employ the illustrative arrangement of our invention shown in FIG. 1, including a relatively large diameter unclad fiber 16, and to join fiber 16 to the desired smaller diameter fiber outside the substrate using a junction box. A junction box suitable for this purpose is shown in cross section in FIGS. 3A and 3B. Junction box 31 is illustratively formed of an optically transparent material, such as poly(methyl methacrylate) having an index of refraction of about 1.49. It includes three connected cavities: cavity 33 at one end of the box having a cross-sectional shape and cross-sectional dimensions adapted for receving an end of large fiber 16; cavity 34 at the other end of the box having a cross-sectional shape and cross-sectional dimensions adapted for receiving an end of the small diameter fiber, such as cladded fiber 36; and tapered cavity 35 which provides a smooth, gradual transition between cavity 33 and cavity 34. Tapered cavity 35 extends over a distance in junction box 31 greater than about 10 free space wavelengths of optical wave 14. Junction box 31 can be formed by successive drillings of a solid poly(methyl methacrylate) block, or by starting with monomeric methyl methacrylate and polymerizing the monomer by photopolymerization around removable (e.g., glass inserts) in the shape of the desired cavities. To provide the interconnection, fiber 16 is inserted in cavity 33 and fiber 36 is inserted in cavity 34, as shown in FIG. 3B. The cavities in junction box 31 are illustratively filled with a transparent filler material 38 having an index of refraction slightly greater than that of the box (e.g., about 1 per cent greater). The filler material 38 may be a transparent cement (e.g., epoxy) or transparent monomer (e.g., cyclohexyl methacrylate) which, when hardened or polymerized, provides a firm attachment of the fibers to the box.

The basic emobdiment of FIG. 1 may itself be modified to improve its ability to couple to cladded fibers having relatively small diameter inner cores. One such modified arrangement is that illustratively shown in FIG. 4 of the drawing. Thin dielectric film 41 is formed on lower refractive index substrate 42 so as to be capable of guiding optical wave 44. Film 41, like film 11 of FIG. 1, has an end region which is gradually tapered between points $X_a$ and $X_b$ to cause optical wave 44 to radiate out of the film into substrate 42 at the cut-off point $X_c$. Optical wave 44 thus propagates out of film 41 into substrate 42 at an angle $\alpha$ (e.g., of about 5°) with respect to the film-substrate interface. Substrate 42 includes tapered cavity 45 which has its central axis oriented essentially along the angle $\alpha$ in the substrate. The end of cavity 45 farthest from the cut-off point $X_c$ has a cross-sectional shape and cross-sectional dimensions adapted for receiving an end cladded optical fiber 46. The end of cavity 45 nearest to cut-off point $X_c$ has smaller cross-sectional dimensions, which are illustratively approximately equal to those of the inner core of fiber 46. These two ends of cavity 45 are connected by a central tapered region which provides, a smooth, gradual transition from the smaller end to the larger end of the cavity. As with cavity 15 of the embodiment of FIG. 1, cavity 45 is illustratively provided with a hemispherical end shape at the end nearest to cut-off point $X_c$ to insure efficient coupling of optical wave 45 into the cavity. Cavity 45 is also illustratively filled with transparent filler material 48 which has an index of refraction exceeding both the index of refraction of substrate 42 and that of the inner core of fiber 46. Filler 48 may be a transparent cement or monomer which, when hardened or polymerized, provides a firm attachment of fiber 46 to substrate 42.

Figure 4:
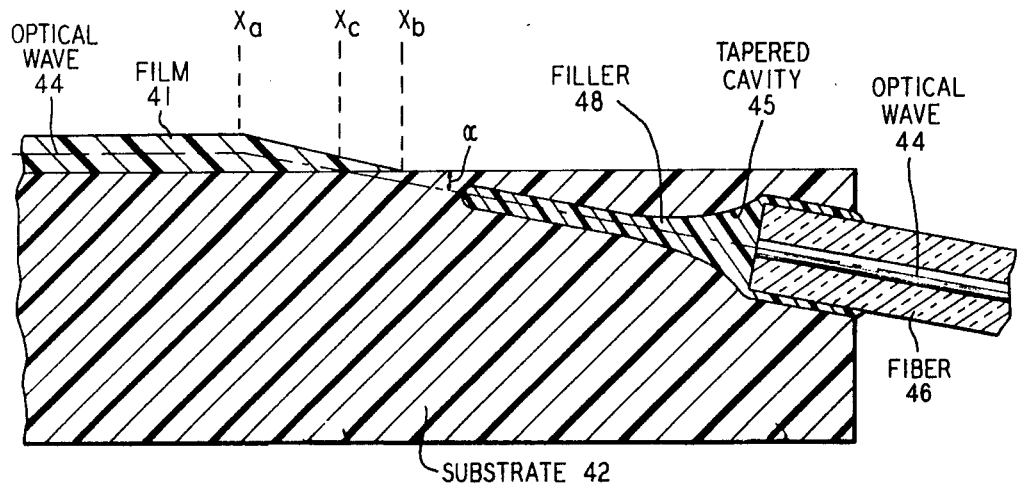
FIG. 4 is a pictorial illustration of a cross-sectional view of a modified embodiment of the invention useful for coupling to cladded optical fibers having relatively small diameter inner cores.

It will be noted that the embodiment of FIG. 4 permits optical wave 44 to be intercepted at a point in substrate 42 where the wave diameter is still relatively small (i.e., at a point close to $X_c$). Tapered cavity 45 in substrate 42 can be provided by successive mechanical drillings, first with a bit of a size comparable to the smaller end of the cavity and then with a bit of a size comparable to the larger end of the cavity, or vice versa. For polymeric substrate materials, such as poly(methyl methacrylate), a monomer of the polymer can be polymerized around a removable insert in the shape of the desired cavity. Other illustrative materials, parameters and details of fabrication are essentially the same as those set forth hereinabove with respect to the embodiment of FIG. 1.

Various modifications of and additions to the embodiments described illustratively hereinabove will be recognized by those skilled in the art without departing from the scope of the invention, as defined by the appended claims. For example, it will be noted that, once the optimum position of the cavity in substrate and of the fiber in the cavity is determined, each of the arrangements of FIGS. 1 and 4 can be used for coupling in a direction opposite to that described, that is, from the fiber to the thin film. The optimum position of the fiber in the cavity can best be determined in each case by manually adjusting the fiber, while the filler material is still in a liquid state, until the intensity of the light coupled into the fiber is a maximum.

What is claimed is:

1. An arrangement for coupling a wave of optical electromagnetic radiation between a thin-film optical waveguide and a fiber optical waveguide, said thin-film waveguide comprising a transparent substrate, a transparent dielectric film formed on a major surface of said substrate, said film having an index of refraction exceeding that of said substrate and a thickness proportioned for guiding said wave of optical electromagnetic radiation, said fiber waveguide comprising an elongated transparent fiber having cross-sectional dimensions and a refractive index distribution also proportioned for guiding said wave, said arrangement being characterized in that said film has an end region that is gradually tapered in thickness along the intended path of said wave to be guided therein to a cut-off point at which said film is incapable of supporting said wave as guided mode, said tapered end region providing emergence of said wave from said film along a path in said substrate, and in that said substrate includes a region defining a cavity disposed to intercept the intended path of said wave in said substrate and into which a portion of the length of said fiber is inserted said cavity having an essentially hemispherical end shape and being filled with a transparent filler material having an index of refraction exceeding that of said substrate to form an essentially hemispherical lens in said substrate at the end of said cavity.

2. The coupling arrangement of claim 1 in which said film has an essentially uniform thickness of the order of the free space wavelength of said wave to be guided therein and in which the taper in the end region of said film is a substantially linear taper to zero thickness extending over a distance of said film greater than 10 times the free space wavelength of said wave.

3. The coupling arrangement of claim 1 in which said transparent filler material is a liquid monomer capable of polymerization to provide firm attachment of said fiber to said substrate in said cavity.

4. The coupling arrangement of claim 1 in which said transparent filler material is a liquid cement which, when hardened, provides a firm attachment of said fiber to said substrate in said cavity.

5. The coupling arrangement of claim 1 in which said region of said substrate defines a cavity having a central axis which is essentially parallel to said major surface of said substrate.

6. The coupling arrangement of claim 1 in which said region of said substrate defines a cavity having a central axis which is essentially collinear with the intended path of said wave in said substrate.

7. The coupling arrangement of claim 1 in which said fiber is a first cylindrically shaped fiber waveguide having a substantially uniform index of refraction exceeding that of said substrate and a diameter in excess of about 100 times the free space wavelength of said wave to be guided therein, and including means external to said substrate for joining said first fiber waveguide to a second fiber waveguide having a guiding region with cross-sectional dimensions substantially less than the diameter of said first fiber waveguide, said joining means comprising a body having a first cavity at one end thereof of a cross-sectional diameter suitable for receiving said first fiber, a second cavity at the opposite end of said body of cross-sectional diameter substantially less than the diameter of said first cavity and suitable for receiving said second fiber, and a third cavity connecting said first cavity to said second cavity, said third cavity having a cross-sectional diameter which is gradually tapered from a value equal to that of said first cavity to a value no greater than that of said second cavity, said third cavity being filled with a transparent filler material having an index of refraction exceeding that of said body, whereby said wave propagating in said body is efficiently transferred between said fibers.

8. The coupling arrangement of claim 6 in which said fiber is a cylindrically shaped, cladded fiber waveguide having an inner core formed of a first transparent material and an outer cladding formed of a second transparent material of lower refractive index than that of said inner core, and in which said region of said substrate defines a cylindrically shaped cavity, the diameter of which gradually increases from a value essentially equal to the diameter of said inner core in a region along its central axis nearest to the cut-off point of said film to a value greater than the diameter of said outer cladding in a region along its central axis farthest from the cut-off point of said film.

* * * * *